United States Patent
Lee (10) Patent No.: US 7,324,404 B2
(45) Date of Patent: Jan. 29, 2008

(54) CLOCK CONTROL CIRCUIT FOR REDUCING CONSUMPTION CURRENT IN DATA INPUT AND OUTPUT OPERATIONS AND SEMICONDUCTOR MEMORY DEVICE INCLUDING THE SAME AND DATA INPUT AND OUTPUT OPERATIONS METHODS OF SEMICONDUCTOR MEMORY DEVICE

(75) Inventor: Yin Jae Lee, Kyeongki-do (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 91 days.

(21) Appl. No.: 11/319,578

(22) Filed: Dec. 29, 2005

(65) Prior Publication Data

US 2007/0085587 A1   Apr. 19, 2007

(30) Foreign Application Priority Data

Oct. 14, 2005   (KR) ..................... 10-2005-0096915

(51) Int. Cl.
*G11C 8/00* (2006.01)
*G11C 7/00* (2006.01)

(52) U.S. Cl. ............ 365/233; 365/189.05; 365/189.08; 365/189.12; 365/194; 365/230.08

(58) Field of Classification Search ........... 365/189.05, 365/189.08, 189.12, 194, 230.08, 233; 327/141, 327/142

See application file for complete search history.

(56) References Cited

U.S. PATENT DOCUMENTS

| 6,151,270 | A  | * | 11/2000 | Jeong ......................... 365/233 |
| 6,948,084 | B1 | * | 9/2005  | Manapat et al. ............ 365/233 |
| 6,996,016 | B2 | * | 2/2006  | Oh .............................. 365/233 |
| 7,054,223 | B2 | * | 5/2006  | Takahashi et al. .......... 365/233 |

* cited by examiner

*Primary Examiner*—Trong Phan
(74) *Attorney, Agent, or Firm*—Lowe Hauptman Ham & Berner LLP (57) ABSTRACT

The present invention relates to a clock control circuit, it can reduce power consumption in data input and output operations, and a semiconductor memory device including the clock control circuit, and data input and output operation method of the semiconductor memory device. The clock control circuit according to the present invention can generate an input or output control clock signal only when data are substantially input or output in the data input and output operations. It is thus possible to save unnecessary power consumption.

28 Claims, 8 Drawing Sheets

CLOCK CONTROL CIRCUIT FOR REDUCING CONSUMPTION CURRENT IN DATA INPUT AND OUTPUT OPERATIONS AND SEMICONDUCTOR MEMORY DEVICE INCLUDING THE SAME AND DATA INPUT AND OUTPUT OPERATIONS METHODS OF SEMICONDUCTOR MEMORY DEVICE

BACKGROUND

1. Field of the Invention

The present invention relates to semiconductor memory devices and more particularly, to semiconductor memory devices including a clock control circuit that generates clock signals to control the input and output operations of data input and output buffers of the semiconductor memory device and data input and output operations method thereof.

2. Discussion of Related Art

In general, the data input and output operations of a semiconductor memory device that is operated in synchronization with a clock signal, such as a synchronous semiconductor memory device, is performed in synchronization with internal clock signals.

In other words, in a write operation, a data input buffer of the synchronous semiconductor memory device outputs received external input data to an internal circuit in synchronization with an internal clock signal. Furthermore, in a read operation, a data output buffer of the synchronous semiconductor memory device outputs internal output data, which are received from the internal circuit, to an external apparatus in synchronization with the internal clock signal.

The data input and output operations of the semiconductor memory device will be described in more detail below with reference to FIGS. 1 and 2.

Figure 1:
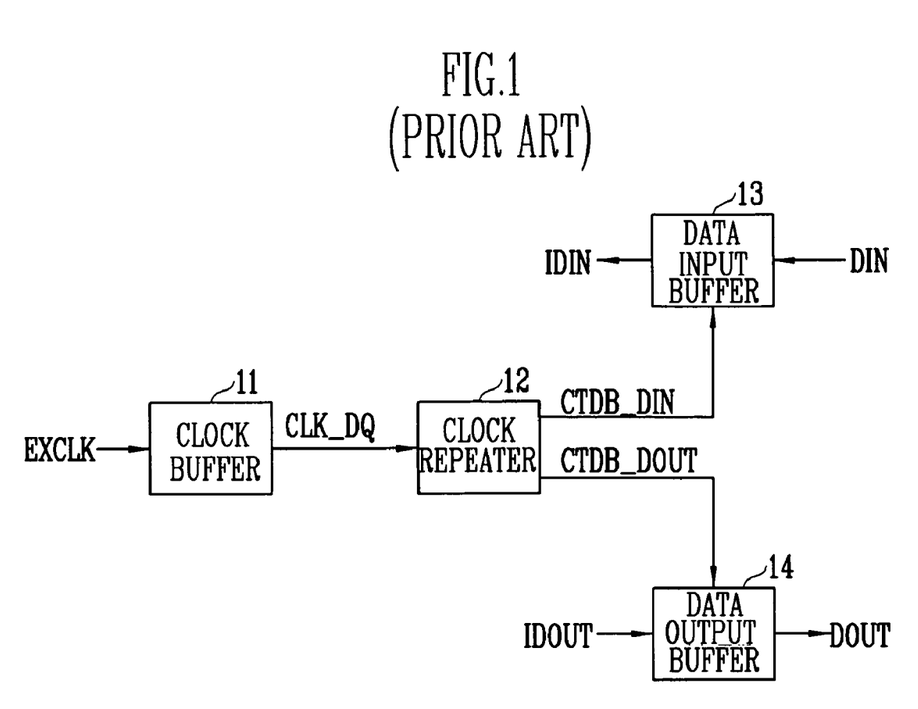
FIG. 1 is a schematic block diagram of a clock control circuit and data input and output buffers of a semiconductor memory device in the related art.

FIG. 1 is a schematic block diagram of a clock control circuit and data input and output buffers of a semiconductor memory device in the related art. FIG. 2 is a timing diagram of signals related to the operation of the clock control circuit and the data input and output buffers shown in FIG. 1.

Referring to FIG. 1, a clock buffer 11 receives an external clock signal (EXCLK) and outputs an input clock signal (CLK_DQ). A clock repeater 12 outputs an input control clock signal (CTDB_DIN) and an output control clock signal (CTDB_DOUT) based on the input clock signal (CLK_DQ). A data input buffer 13 receives external input data (DIN) and outputs internal input data (IDIN) to an internal circuit (not shown) in response to the input control clock signal (CTDB_DIN). A data output buffer 14 receives internal output data (IDOUT) from an internal circuit and outputs external output data (DOUT) to an external apparatus in response to the output control clock signal (CTDB_DOUT).

The input control clock signal (CTDB_DIN) and the output control clock signal (CTDB_OUT) have the same phase.

Figure 2:
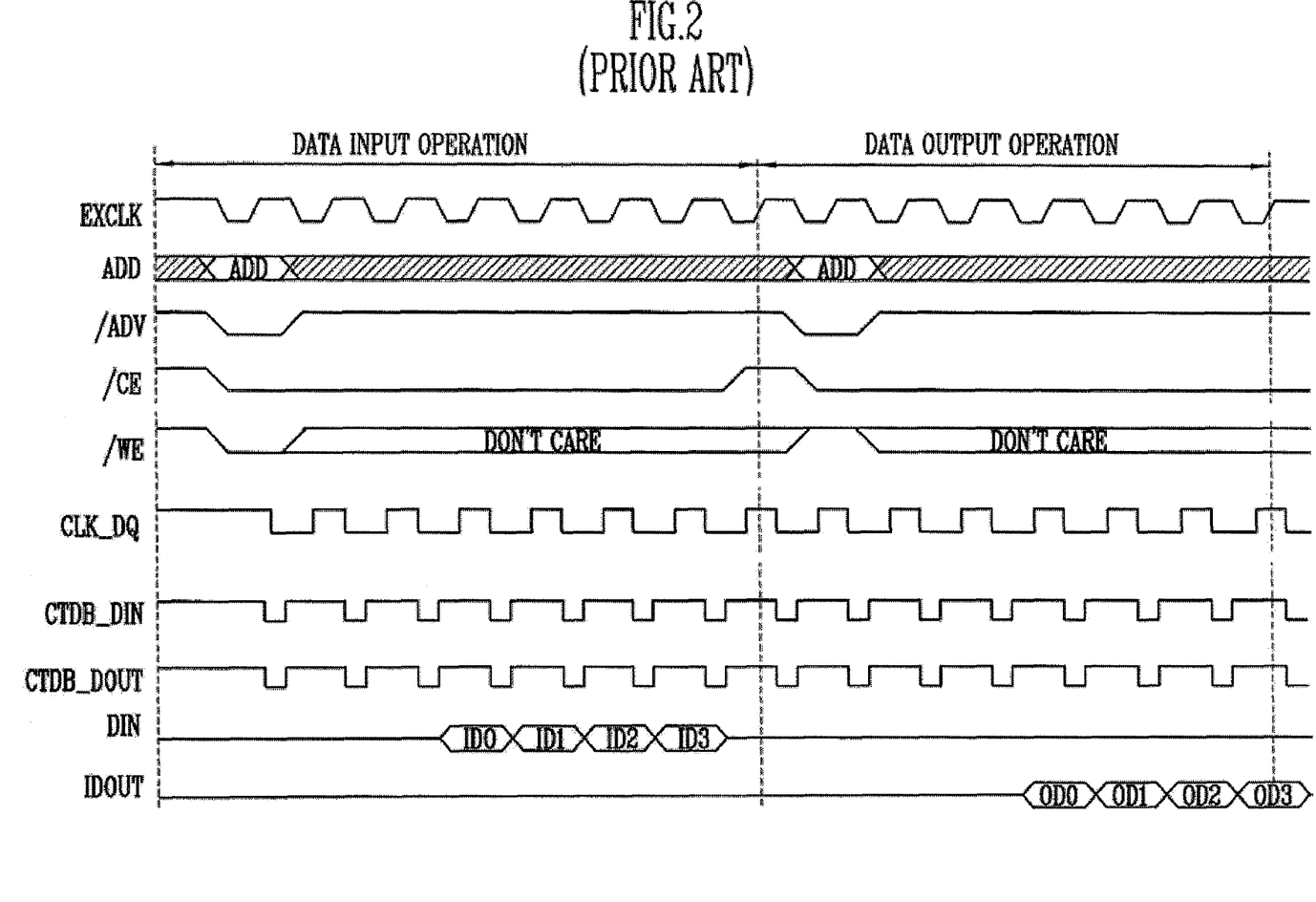
FIG. 2 is a timing diagram of signals related to the operation of the clock control circuit and the data input and output buffers shown in FIG. 1.

As shown in FIG. 2, the chip enable signal (/CE) is disabled and a write command (not shown) is input to the semiconductor memory device. Furthermore, when the address valid signal (/ADV) is disabled, the address signal (ADD) is input to the semiconductor memory device. Meanwhile, when the address valid signal (/ADV) is disabled, the write enable signal (/WE) is disabled. The clock repeater 12 consecutively outputs the input control clock signal (CTDB_ DIN) and the output control clock signal (CTDB_OUT) whenever receiving the input clock signal (CLK_DQ) (i.e., whenever the input clock signal (CLK_DQ) is toggled). Therefore, the data input buffer 13 consecutively operates in response to the input control clock signals (CTDB_DIN) that are consecutively toggled in periods where external input data (DIN, ID0 to ID3) are not received.

The data output buffer 14 also consecutively operates in response to the output control clock signal (CTDB_OUT) in period where internal output data (IDOUT, OD0 to OD3) are not received. If the clock repeater 12, the data input buffer 13 and the data output buffer 14 are consecutively operated as described above, the amount of unnecessary current consumption is increased. This will be described in more detail below.

The clock repeater 12 includes a plurality of transistors (not shown). The transistors have a relatively high current driving ability. The reason why the transistors have a relatively high current driving ability is for supplying the input control clock signal (CTDB_DIN) and the output control clock signal (CTDB_OUT) to the data input buffer 13 and the data output buffer 14, which have a relatively high resistance component.

Since the transistors have a relatively high current driving ability as described above, a relatively great amount of current is consumed when the transistors are driven. Furthermore, whenever the input control clock signal (CTDB_ DIN) and the output control clock signal (CTDB_OUT) are toggled, the data input buffer 13 and the data output buffer 14 are operated, consuming lots of current.

As described above, the clock repeater 12 of the related art consecutively toggles the input control clock signal (CTDB_DIN) and the output control clock signal (CTDB_OUT) regardless of an input or output time point of data. Therefore, a problem arises because the amount of unnecessary current consumption is increased.

This problem is more profound in the case where semiconductor memory devices including the clock repeater 12 are applied to mobile products. That is, the mobile products must operate for a long period of time at low power. To reduce power consumption, power consumption of semiconductor chips included in the mobile products must be reduced.

Power consumption of the semiconductor memory device is, however, increased due to the consecutive operation of the clock repeater 12. This makes it impossible for the mobile products to operate for a long period of time.

SUMMARY OF THE INVENTION

An advantage of the present invention is that it provides a clock control circuit of a semiconductor memory device, in which an input or output control clock signal is generated only when data are substantially input or output in data input and output operations, thus reducing unnecessary power consumption.

Another advantage of the present invention is that it provides a semiconductor memory device including a clock control circuit, in which an input or output control clock signal is generated only when data are substantially input or output in data input and output operations, thus reducing unnecessary power consumption.

Further another advantage of the present invention is that it provides a data input and output operation method of a semiconductor memory device, in which an input or output control clock signal is generated only when data are substantially input or output in data input and output operations, thus reducing unnecessary power consumption.

A clock control circuit of a semiconductor memory device according to the present invention includes a clock generator and a clock latency control circuit. The clock generator selectively generates any one of an input control clock signal and an output control clock signal only during a predetermined time in response to an input clock signal, an internal write enable signal and a latency signal. The clock latency control circuit generates the latency signal in response to the input clock signal, the internal write enable signal, the internal address valid signal and the internal chip select signal. A data input buffer receives external input data and outputs internal input data to an internal circuit, in response to the input control clock signal, and a data output buffer receives internal output data from the internal circuit and outputs external output data, in response to the output control clock signal.

A semiconductor memory device that operates in synchronization with an external clock signal according to the present invention includes a clock buffer, a control signal input buffer, a clock control circuit, a data input buffer and a data output buffer. The clock buffer receives an external clock signal and outputs an input clock signal. The control signal input buffer receives a write enable signal and outputs an internal write enable signal. The clock control circuit selectively generates any one of an input control clock signal and an output control clock signal in response to the input clock signal, the internal write enable signal, an internal address valid signal and an internal chip select signal. The data input buffer receives external input data and outputs internal input data to an internal circuit, in response to the input control clock signal. The data output buffer receives internal output data from the internal circuit and outputs external output data, in response to the output control clock signal.

A data input and output operation method of a semiconductor memory device that operates in synchronization with an external clock signal according to the present invention includes the steps of outputting an input clock signal in response to the external clock signal, outputting an internal write enable signal in response to a write enable signal, generating a latency signal in response to the input clock signal, the internal write enable signal, an internal address valid signal and an internal chip select signal, selectively generating any one of an input control clock signal and an output control clock signal during a predetermined time in response to the input clock signal, the internal write enable signal and the latency signal, allowing a data input buffer to receive external input data and to output internal input data to an internal circuit, in response to the input control clock signal when the input control clock signal is generated, and allowing a data output buffer to receive internal output data from the internal circuit and to output external output data, in response to the output control clock signal when the output control clock signal is generated.

BRIEF DESCRIPTION OF THE DRAWINGS

FIG. 5b is a timing diagram of signals related to the operation of the pulse signal generator shown in FIG. 5a;

DETAILED DESCRIPTION OF PREFERRED EMBODIMENTS

The present invention will now be described in connection with preferred embodiments with reference to the accompanying drawings.

Figure 3:
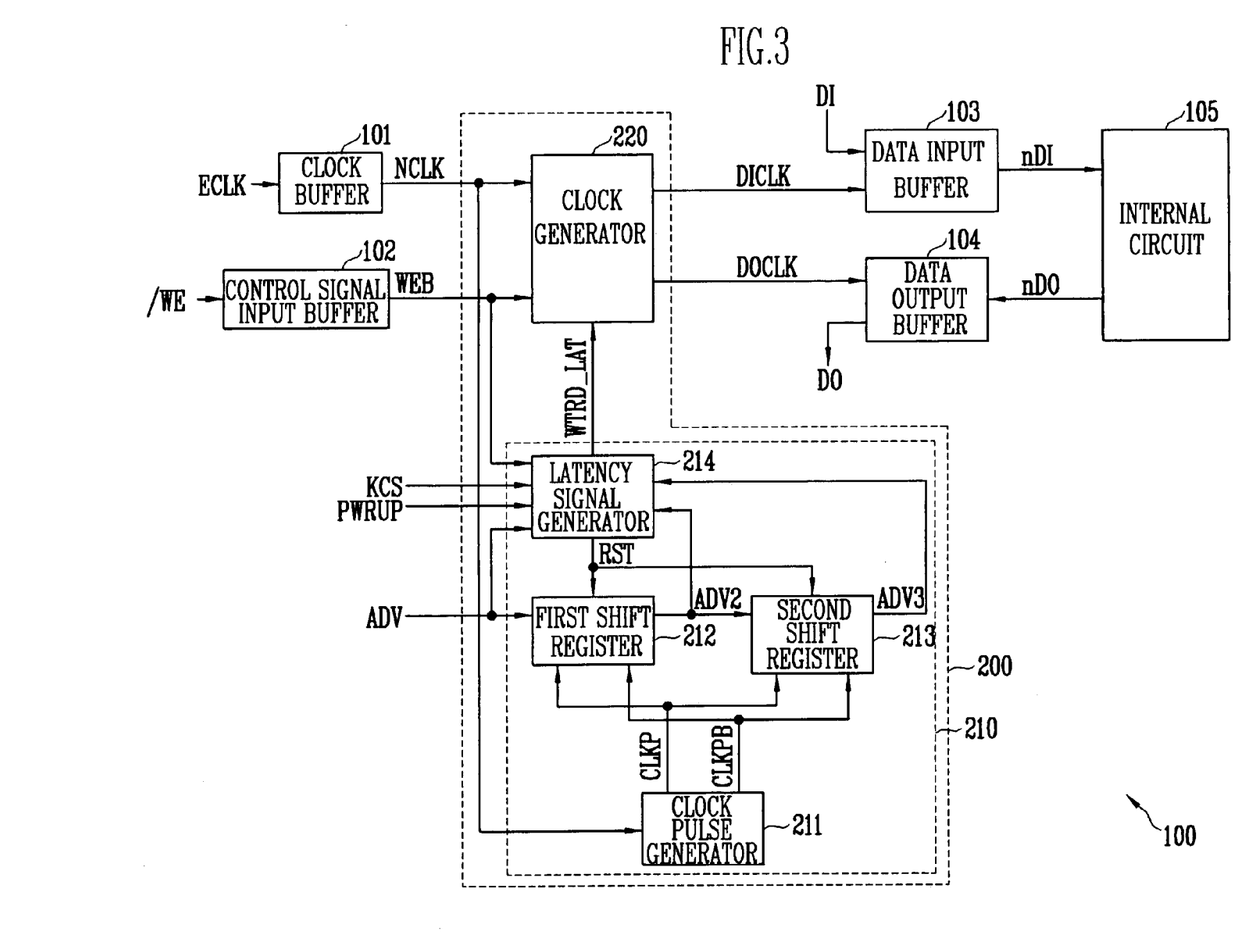
FIG. 3 is a schematic block diagram of a semiconductor memory device including a clock control circuit according to an embodiment of the present invention.

FIG. 3 is a schematic block diagram of a semiconductor memory device including a clock control circuit according to an embodiment of the present invention.

Referring to FIG. 3, a semiconductor memory device 100 includes a clock buffer 101, a control signal input buffer 102, a data input buffer 103, a data output buffer 104, an internal circuit 105 and a clock control circuit 200.

The clock buffer 101 receives an external clock signal (ECLK) and outputs an input clock signal (NCLK). The control signal input buffer 102 receives a write enable signal (/WE) and outputs an internal write enable signal (WEB). The data input buffer 103 receives external input data (DI) and outputs internal input data (nDI) to the internal circuit 105, in response to an input control clock signal (DICLK). The data output buffer 104 receives internal output data (nDO) from the internal circuit 105 and outputs external output data (DO), in response to an output control clock signal (DOCLK).

The clock control circuit 200 includes a clock latency control circuit 210 and a clock generator 220. The clock latency control circuit 210 includes a clock pulse generator 211, a first shift register 212, a second shift register 213 and a latency signal generator 214.

Figure 9:
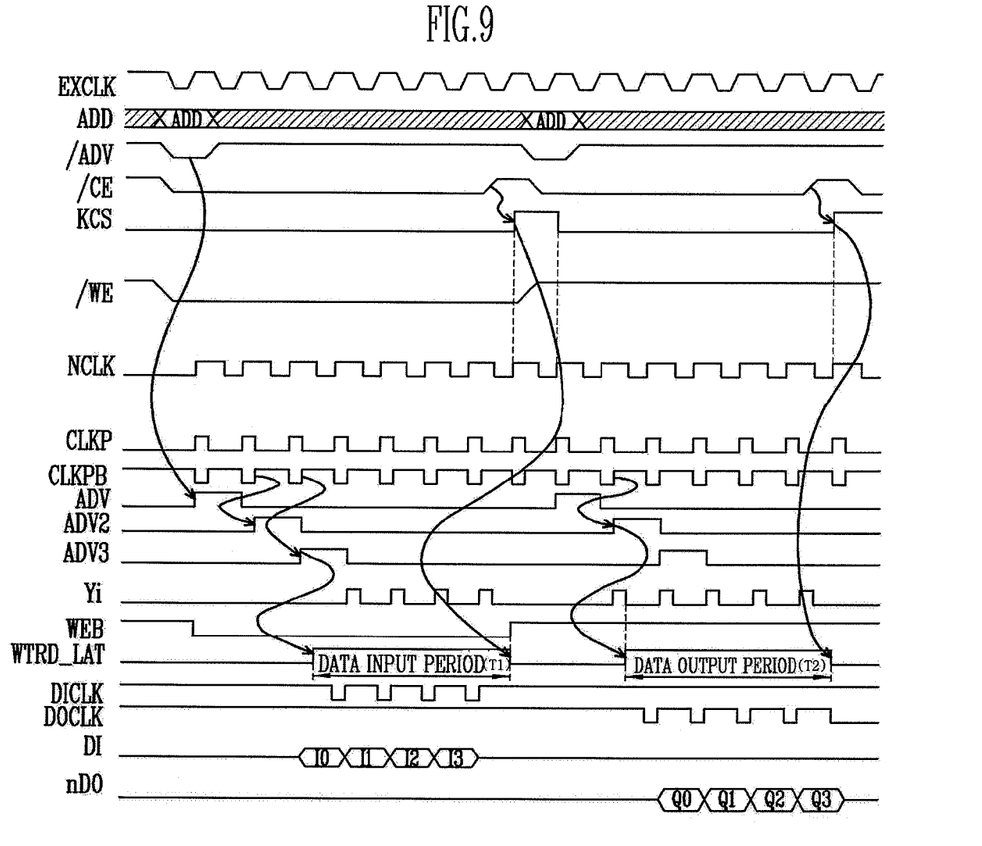
FIG. 9 is a timing diagram of signals related to the data input and output operations of the semiconductor memory device shown in FIG. 3.

The clock pulse generator 211 generates clock pulse signals (CLKP, CLKPB) in response to the input clock signal (NCLK). Phases of the clock pulse signals (CLKP, CLKPB) can be opposite to each other as shown in FIG. 9.

The first shift register 212 outputs a first shift signal (ADV2) in response to the clock pulse signals (CLKP, CLKPB) and an internal address valid signal (ADV). The internal address valid signal (ADV) is a high pulse signal that is generated by a generating apparatus (not shown), based on an address valid signal (/ADV) and the input clock signal (NCLK), as shown in FIG. 9.

Furthermore, the first shift register 212 delays the internal address valid signal (ADV) for a predetermined clock cycle of the clock pulse signals (CLKP, CLKPB) and outputs the delayed signal as a first shift signal (ADV2). The predetermined clock cycle can be one clock cycle. Furthermore, the predetermined clock cycle can be varied in various manners, if appropriate.

The second shift register 213 outputs a second shift signal (ADV3) in response to the clock pulse signals (CLKP, CLKPB) and the first shift signal (ADV2). The second shift register 213 delays the first shift signal (ADV2) for a predetermined clock cycle of the clock pulse signals (CLKP, CLKPB) and outputs the delayed signal as the second shift signal (ADV3). The first and second shift registers 212, 213 are reset in response to a reset signal (RST).

The latency signal generator 214 inputs the internal write enable signal (WEB), the internal address valid signal (ADV), the first and second shift signals (ADV2, ADV3) and an internal chip select signal (KCS) and outputs the reset signal (RST) and a latency signal (WTRD_LAT) in response to a power-up signal (PWRUP). The internal chip select signal (KCS) becomes logic high in synchronization with a first rising edge of an enable signal (/CE) and an input clock signal (NCLK) when the chip enable signal (/CE) (or the chip select signal (/CS) becomes logic high (i.e., enabled), as shown in FIG. 9. Thereafter, the internal chip select signal (KCS) becomes logic low in synchronization with a second rising edge of the input clock signal (NCLK). The internal chip select signal (KCS) can be generated by an additional generating apparatus (not shown).

The clock generator 220 selectively generates any one of the input control clock signal (DICLK) and the output control clock signal (DOCLK) during a predetermined time in response to the input clock signal (NCLK), the internal write enable signal (WEB) and the latency signal (WTRD_LAT).

Figure 4:
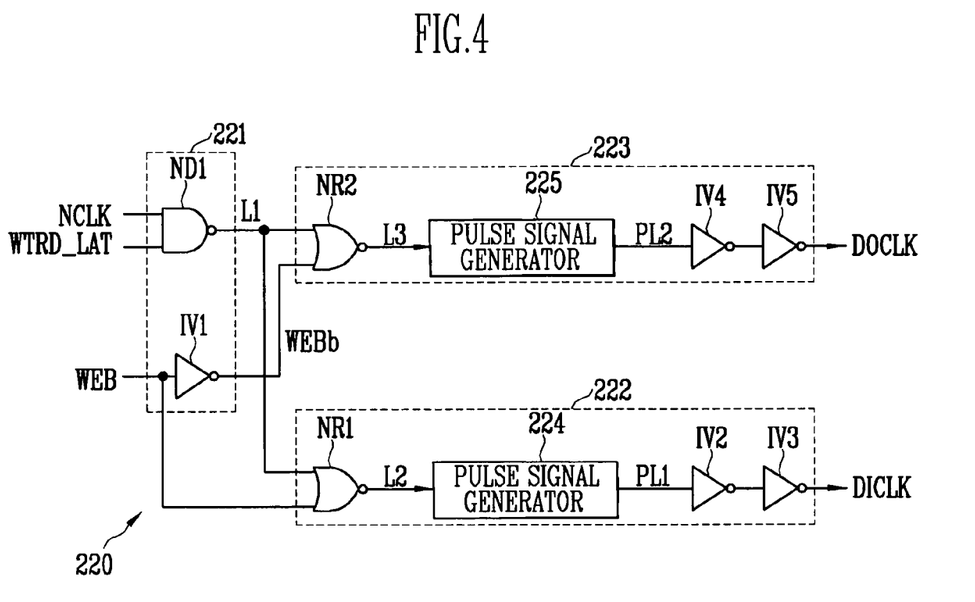
FIG. 4 is a detailed circuit diagram of a clock generator shown in FIG. 3.

FIG. 4 is a detailed circuit diagram of the clock generator 220 shown in FIG. 3.

Referring to FIG. 4, the clock generator 220 includes first to third logic circuits 221 to 223.

The first logic circuit 221 includes a NAND gate ND1 and an inverter IV1. The NAND gate ND1 outputs a logic signal (L1) in response to the input clock signal (NCLK) and the latency signal (WTRD_LAT). The inverter IV1 inverts the internal write enable signal (WEB) and outputs an inverted internal write enable signal (WEBb).

The second logic circuit 222 includes a NOR gate NR1, a pulse signal generator 224 and inverters IV2, IV3. The NOR gate NR1 outputs a logic signal (L2) in response to the logic signal (L1) and the internal write enable signal (WEB). The pulse signal generator 224 generates a pulse signal (PL1) based on the logic signal (L2). The inverters IV2, IV3 are connected in series to the output terminal of the pulse signal generator 224. The inverters IV2, IV3 delay the pulse signal (PL1) and output the delayed signal as the input control clock signal (DICLK).

The third logic circuit 223 includes a NOR gate NR2, a pulse signal generator 225 and inverters IV4, IV5. The NOR gate NR2 outputs a logic signal (L3) in response to the logic signal (L1) and the inverted internal write enable signal (WEBb).

The pulse signal generator 225 generates a pulse signal (PL2) based on the logic signal (L3). The inverters IV4, IV5 are connected in series to the output terminal of the pulse signal generator 225. The inverters IV4, IV5 delay the pulse signal (PL2) and output the delayed signal as the output control clock signal (DOCLK). When the second logic circuit 222 outputs the input control clock signal (DICLK), the third logic circuit 223 may not output the output control clock signal (DOCLK). This will be described in more detail below.

When the internal write enable signal (WEB) is disabled (i.e., in the write operation), the second logic circuit 222 outputs the input control clock signal (DICLK) while the latency signal (WTRD_LAT) is enabled. At this time, the third logic circuit 223 does not output the output control clock signal (DOCLK). Furthermore, when the internal write enable signal (WEB) is enabled, (i.e., in the read operation), the third logic circuit 223 outputs the output control clock signal (DOCLK) while the latency signal (WTRD_LAT) is enabled. At this time, the second logic circuit 222 does not output the input control clock signal (DICLK).

Figure 5A:
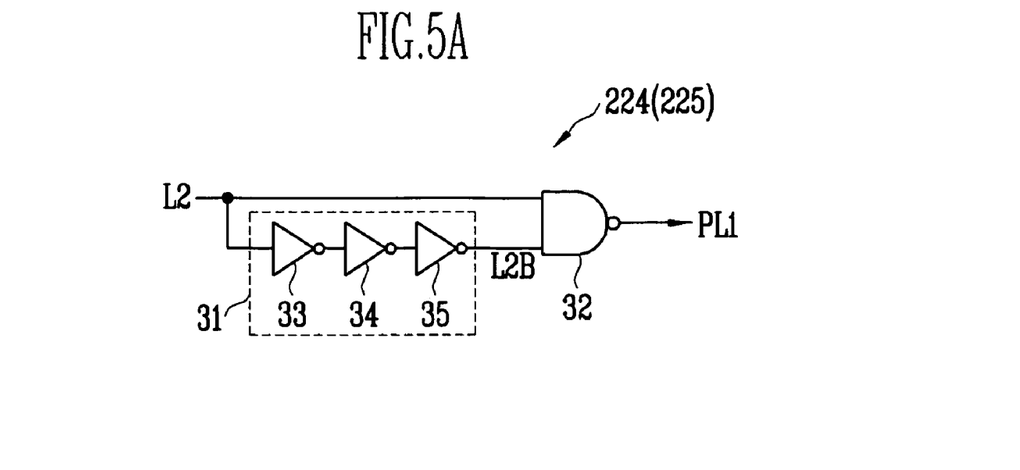
FIG. 5a is a detailed circuit diagram of a pulse signal generator shown in FIG. 4.

FIG. 5a is a detailed circuit diagram of the pulse signal generator shown in FIG. 4.

Figure 5B:
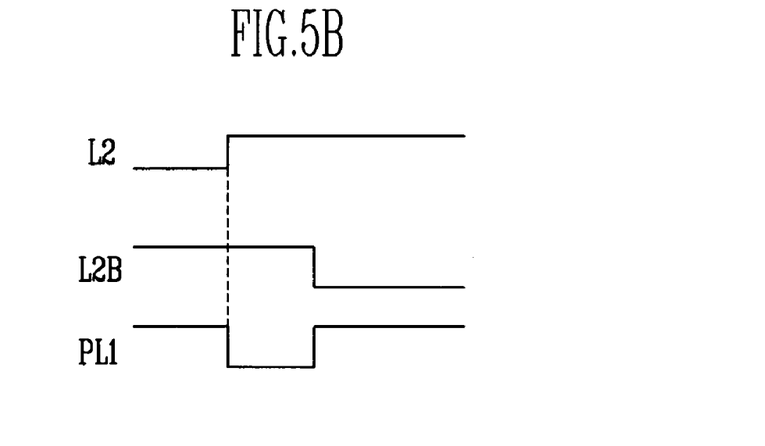

Referring to FIG. 5a, the pulse signal generator 224 includes a delay circuit 31 and a NAND gate 32. The delay circuit 31 includes inverters 33 to 35. Te inverters 33 to 35 are connected in series, and they delay the logic signal (L2) and output an inverted logic signal (L2B). The NAND gate 32 outputs a pulse signal (PL1) of a low pulse form in response to the logic signal (L2) and the inverted logic signal (L2B). This will be described in more detail below. The NAND gate 32 outputs the pulse signal (PL1) that is kept to logic low while the logic signal (L2) and the inverted logic signal (L2B) are all logic high, as show in FIG. 5b. The construction and operation of the pulse signal generator 225 are the same as those of the pulse signal generator 224.

Figure 6:
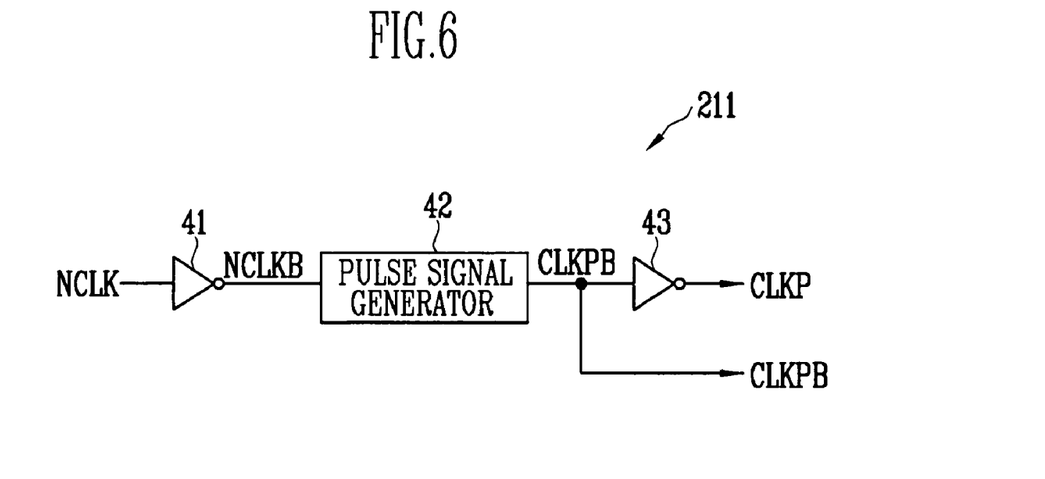
FIG. 6 is a detailed circuit diagram of the clock pulse generator shown in FIG. 3.

FIG. 6 is a detailed circuit diagram of the clock pulse generator 211 shown in FIG. 3.

Referring to FIG. 6, the clock pulse generator 211 includes inverters 41, 43 and a pulse signal generator 42. The inverter 41 inverts the input clock signal (NCLK) and outputs an inverted input clock signal (NCLKB). The pulse signal generator 42 outputs the clock pulse signal (CLKPB) based on the inverted input clock signal (NCLKB). The construction and operation of the pulse signal generator 42 are the same as those of the aforementioned pulse signal generator 224. Description thereof will be omitted in order to avoid redundancy. The inverter 43 inverts the clock pulse signal (CLKPB) and outputs the inverted signal as the clock pulse signal (CLKP).

Figure 7:
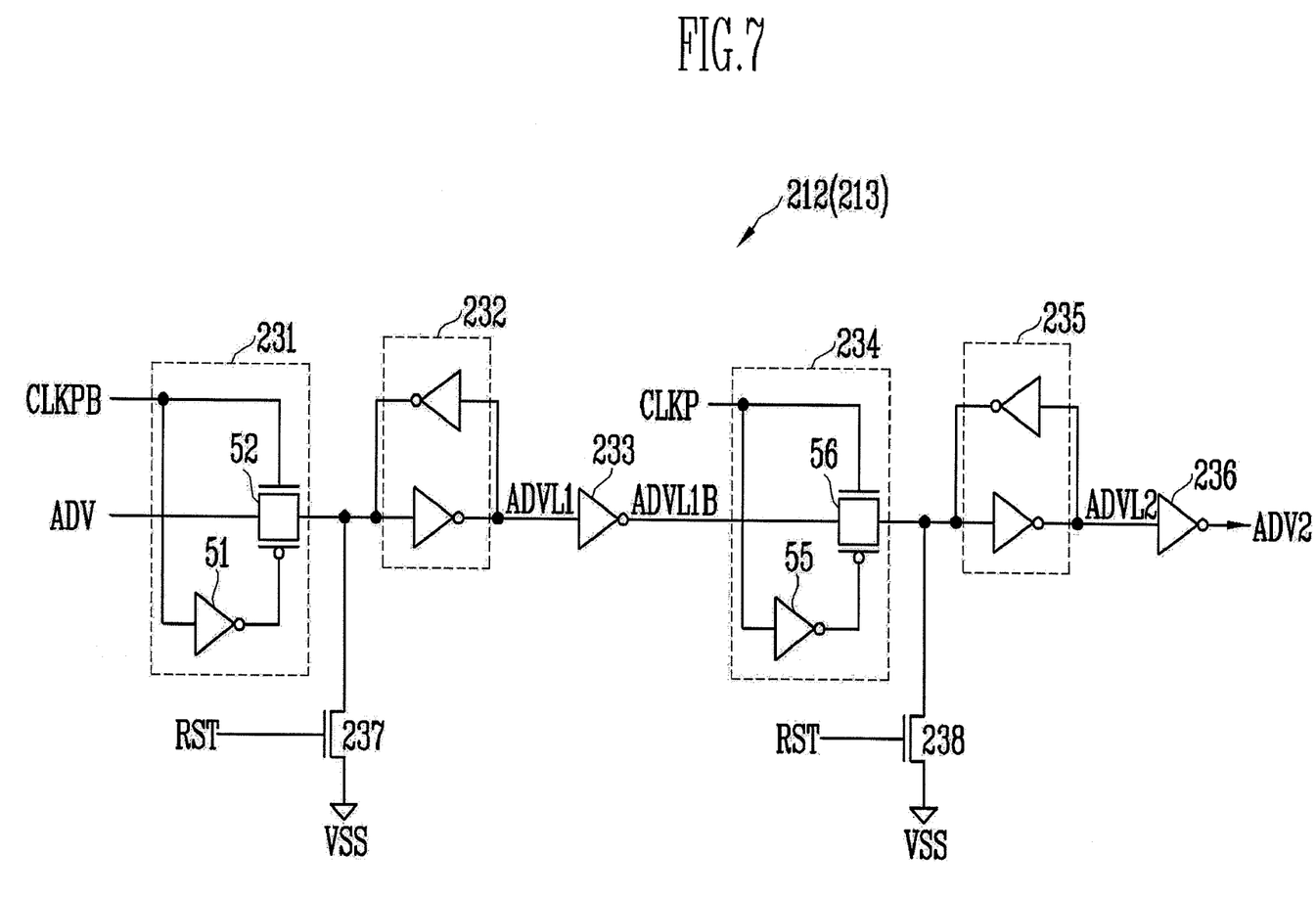
FIG. 7 is a detailed circuit diagram of a first or second shift register shown in FIG. 3.

FIG. 7 is a detailed circuit diagram of the first or second shift register shown in FIG. 3. The construction and operation of the first and second shift registers 212, 213 are the same. Therefore, only the first shift register 212 will be described as an example with reference to FIG. 7.

Referring to FIG. 7, the first shift register 212 includes pass circuits 231, 234, latch circuits 232, 235, inverters 233, 236 and reset circuits 237, 238. The pass circuit 231 includes an inverter 51 and a pass gate 52. The pass circuit 232 includes an inverter 55 and a pass gate 56.

The pass circuit 231 receives the internal address valid signal (ADV) in response to the clock pulse signal (CLKPB) and outputs or does not output the latch circuit 232. When the clock pulse signal (CLKPB) is logic high, the pass circuit 231 outputs the internal address valid signal (ADV) to the latch circuit 232.

If the internal address valid signal (ADV) is received from the pass circuit 231, the latch circuit 232 latches the internal address valid signal (ADV) and outputs a latched signal (ADVL1).

The inverter 233 inverts the latched signal (ADVL1) and outputs an inverted latch signal (ADVL1B).

The pass circuit 234 receives the inverted latch signal (ADVL1B) in response to the clock pulse signal (CLKP) and outputs or does not output the latch circuit 235. When the clock pulse signal (CLKP) is logic high, the pass circuit 234 outputs the inverted latch signal (ADVL1B) to the latch circuit 235. At this time, since the clock pulse signals (CLKP, CLKPB) have opposite phases, the pass circuits 231, 234 alternately operates. In other words, when the pass circuit 231 outputs the internal address valid signal (ADV) to the latch circuit 232, the pass circuit 234 does not output the inverted latch signal (ADVL1B) to the latch circuit 235. Furthermore, when the pass circuit 234 outputs the inverted latch signal (ADVL1B) to the latch circuit 235, the pass circuit 231 does not output the internal address valid signal (ADV) to the latch circuit 232.

If the inverted latch signal (ADVL1B) is received from the pass circuit 234, the latch circuit 235 latches the inverted latch signal (ADVL1B) and outputs a latched signal (ADVL2).

The inverter 236 inverts the latched signal (ADVL2) and outputs the inverted signal as the first shift signal (ADV2).

The reset circuits 237, 238 reset the latch circuits 232, 235, respectively, by discharging the input terminals of the latch circuits 232, 235 to a ground voltage (VSS) in response to the reset signal (RST). The reset circuits 237, 238 can be implemented using a NMOS transistor.

Figure 8:
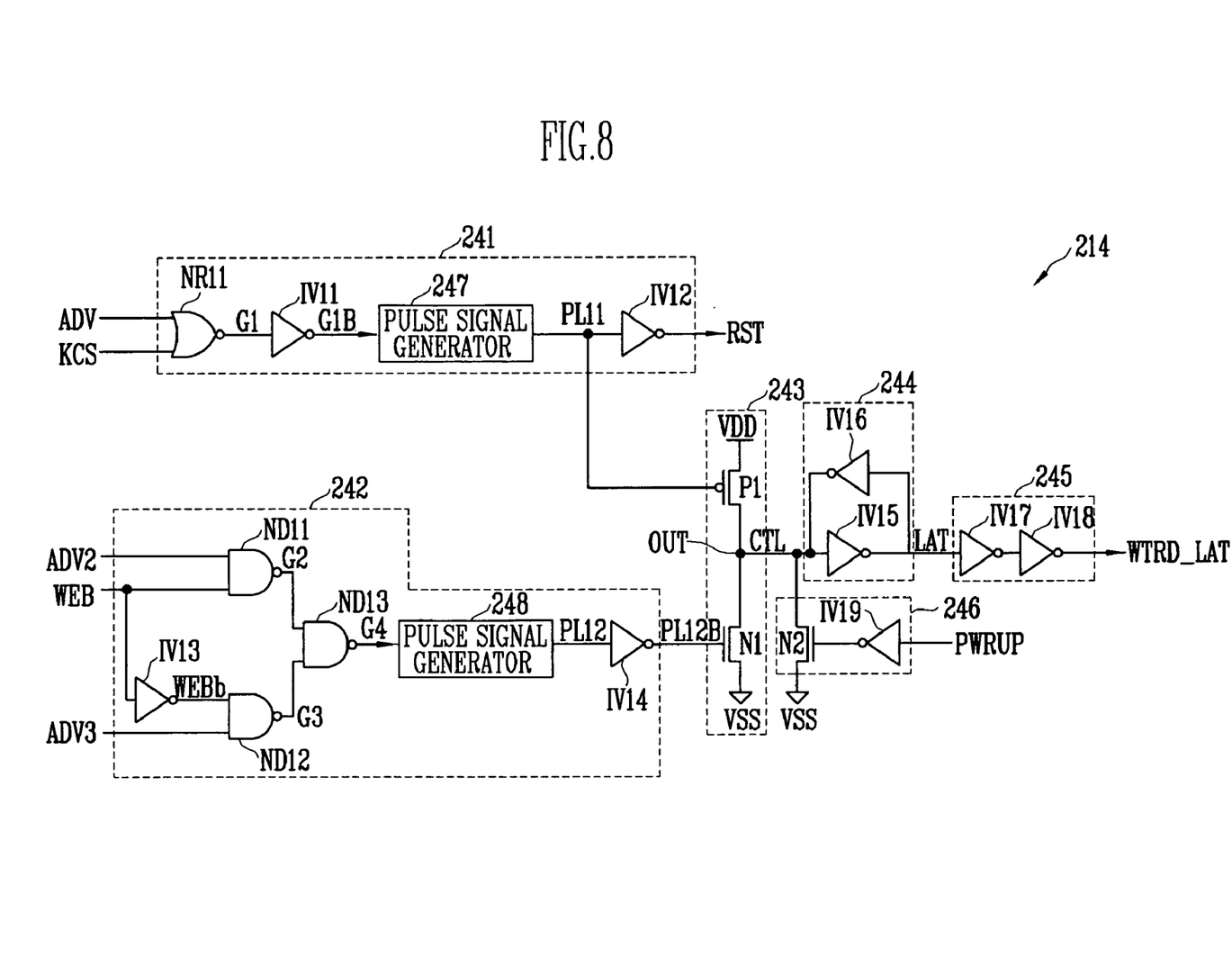
FIG. 8 is a detailed circuit diagram of a latency signal generator shown in FIG. 3.

FIG. 8 is a detailed circuit diagram of the latency signal generator 214 shown in FIG. 3.

Referring to FIG. 8, the latency signal generator 214 includes a first control logic circuit 241, a second control logic circuit 242, a driver circuit 243, a latch circuit 244, an output circuit 245 and a reset control circuit 246.

The first control logic circuit 241 includes a NOR gate NR11, inverters IV11, IV12 and a pulse signal generator 247. The NOR gate NR11 outputs a logic signal (G1) in response to the internal address valid signal (ADV) and the internal chip select signal (KCS). The inverter IV11 inverts the logic signal (G1) and outputs an inverted logic signal (G1B). The pulse signal generator 247 outputs a first pulse signal (PL11) based on the inverted logic signal (G1B). The construction and operation of the pulse signal generator 247 are the same as those of the aforementioned pulse signal generator 224. Therefore, description thereof will be omitted for simplicity. The inverter IV12 inverts the first pulse signal (PL11) and outputs the inverted signal as the reset signal (RST).

The second control logic circuit 242 includes inverters IV13, IV14, NAND gates ND11 to ND13 and a pulse signal generator 248. The inverter IV 13 inverts the internal write enable signal (WEB) and outputs an inverted internal write enable signal (WEBb). The NAND gate ND11 outputs the logic signal (G2) in response to the first shift signal (ADV2) and the internal write enable signal (WEB). The NAND gate ND12 outputs a logic signal (G3) in response to the inverted internal write enable signal (WEBb) and the second shift signal (ADV3). The NAND gate ND13 outputs a logic signal (G4) in response to the logic signals (G2, G3). Furthermore, the pulse signal generator 248 generates an internal pulse signal (PL12) based on a logic signal (G4).

The construction and operation of the pulse signal generator 248 are the same as those of the aforementioned pulse signal generator 224. Therefore, description thereof will be omitted for simplicity. The inverter IV14 inverts the internal pulse signal (PL12) and outputs the inverted signal as a second pulse signal (PL12B). When the internal write enable signal (WEB) is disabled, the second control logic circuit 242 can generate the second pulse signal (PL12B) based on the second shift signal (ADV3). Furthermore, when the internal write enable signal (WEB) is enabled, the second control logic circuit 242 can generate the second pulse signal (PL12B) based on the first shift signal (ADV3).

The driver circuit 243 includes a PMOS transistor P1 and a NMOS transistor N1. The PMOS transistor P1 is turned on or off in response to the first pulse signal (PL11). The PMOS transistor P1 is turned on to supply an internal voltage (VDD) to an output node OUT. The NMOS transistor N1 is turned on or off in response to the second pulse signal (PL12B). The NMOS transistor N1 is turned on to supply the ground voltage (VSS) to the output node OUT. As a result, the internal voltage (VDD) or the control signal (CTL) of the ground voltage (VSS) level is generated from the output node OUT.

The latch circuit 244 includes inverters (IV15, IV16) and latches the control signal (CTL) and outputs a latched signal (LAT).

The output circuit 245 includes inverters (IV17, IV18) and outputs the latched signal (LAT) as the latency signal (WTRD_LAT).

Consequently, when the internal write enable signal (WEB) is disabled, the latency signal generator 214 enables the latency signal (WTRD_LAT) in response to the second shift signal (ADV3). Furthermore, when the internal write enable signal (WEB) is enabled, the latency signal generator 214 enables the latency signal (WTRD_LAT) in response to the first shift signal (ADV2). Furthermore, when any one of the internal address valid signal (ADV) and the internal chip select signal (KCS) is enabled, the latency signal generator 214 disables the latency signal (WTRD_LAT).

The reset control circuit 246 initializes the latch circuit 244 by discharging the output node OUT to the ground voltage (VSS) in response to the power-up signal (PWRUP). The reset control circuit 246 includes an inverter IV19 and a NMOS transistor N2. The inverter IV19 inverts a power-up signal (PWRUP). The NMOS transistor N2 is turned on or off in response to the output signal of the inverter IV19. The NMOS transistor N2 is turned on to discharge the output node OUT to the ground voltage (VSS).

Hereinafter, a data write operation and a data read operation of the semiconductor memory device 100 will be described in detail with reference to FIG. 9.

The data write operation of the semiconductor memory device 100 will be first described. The chip enable signal (/CE) is disabled and a write command (not shown) is input to the semiconductor memory device 100. Furthermore, when the address valid signal (/ADV) is disabled, the address signal (ADD) is input to the semiconductor memory device 100. Meanwhile, when the address valid signal (/ADV) is disabled, the write enable signal (/WE) is disabled.

The control signal input buffer 102 receives the write enable signal (/WE) and outputs the internal write enable signal (WEB). The internal write enable signal (WEB) can be disabled when the write enable signal (/WE) is disabled and can be enabled when the write enable signal (/WE) is enabled.

The clock buffer 101 receives the external clock signal (ECLK) and outputs the input clock signal (NCLK). A generating apparatus (not shown) generates the internal address valid signal (ADV) of a high pulse signal form based on the input clock signal (NCLK) and the address valid signal (/ADV).

The clock pulse generator 211 of the clock latency control circuit 210 generates the clock pulse signals (CLKP, CLKPB) in response to the input clock signal (NCLK). The first shift register 212 of the clock latency control circuit 210 delays the internal address valid signal (ADV) during one clock cycle of the clock pulse signals (CLKP, CLKPB) and outputs the delayed signal as the first shift signal (ADV2). The second shift register 213 of the clock latency control circuit 210 delays the first shift signal (ADV2) during one clock cycle of the clock pulse signals (CLKP, CLKPB) and outputs the delayed signal as the second shift signal (ADV3).

Meanwhile, a word line WL corresponding to the address signal (ADD) is enabled and a column select signal (Yi) for selecting a bit line is enabled. At this time, since the internal write enable signal (WEB) is disabled, the latency signal generator 214 enables the latency signal (WTRD_LAT) in response to the second shift signal (ADV3). As a result, the clock generator 220 generates the input control clock signal (DICLK) in synchronization with the input clock signal (NCLK) during a period where the latency signal (WTRD_LAT) is enabled (T1).

The data input buffer 103 receives the external input data (DI, I0 to I3) in response to the input control clock signal (DICLK) and outputs the internal input data (nDI) to the internal circuit 105.

Thereafter, if the write operation of the semiconductor memory device 100 is finished, the chip enable signal (/CE) and the write enable signal (/WE) are enabled. The control signal input buffer 102 enables the internal write enable signal (WEB) in response to the write enable signal (/WE). Furthermore, as the chip enable signal (/CE) is enabled, the internal chip select signal (KCS) is enabled during a predetermined time. The latency signal generator 214 disables the latency signal (WTRD_LAT) in response to the internal chip select signal (KCS). As a result, the clock generator 220 stops the output operation of the input control clock signal (DICLK).

As described above, the clock control circuit 200 outputs the input control clock signal (DICLK) only when data are substantially received. Therefore, unnecessary power consumption of the semiconductor memory device 100 can be saved. Furthermore, since unnecessary power consumption of the semiconductor memory device 100 can be saved, a power noise phenomenon (i.e., a phenomenon in which a data signal or a control signal flowing through a transfer line is influenced by current flowing through neighboring power lines) of the semiconductor memory device 100 can be reduced. In addition, in the case where the semiconductor memory device 100 is applied to mobile products, the battery time of the mobile products can be extended.

The data read operation of the semiconductor memory device 100 will now be described. The data read operation of the semiconductor memory device 100 is the same as the aforementioned data write operation thereof except for several points. Therefore, in the present embodiment, only the differences will be described.

Referring to FIG. 9, in the data read operation, the read command (not shown) is input to the semiconductor memory device 100. The write enable signal (/WE) keeps enabled. The control signal input buffer 102 enables the internal write enable signal (WEB) in response to the write enable signal (/WE). Since the internal write enable signal (WEB) is enabled, the latency signal generator 214 enables the latency signal (WTRD_LAT) in response to the first shift signal (ADV2).

As a result, the clock generator 220 generates the output control clock signal (DOCLK) in synchronization with the input clock signal (NCLK) in a period where the latency signal (WTRD_LAT) is enabled (T2). The data output buffer 104 receives the internal output data (nDO, Q0 to Q3) and outputs the external output data (DO) to the external apparatus (not shown), in response to the output control clock signal (DOCLK).

Thereafter, if the read operation of the semiconductor memory device 100 is completed, the chip enable signal (/CE) is enabled. As the chip enable signal (/CE) is enabled, the internal chip select signal (KCS) is enabled during a predetermined time. The latency signal generator 214 disables the latency signal (WTRD_LAT) in response to the internal chip select signal (KCS). As a result, the clock generator 220 stops the output operation of the output control clock signal (DOCLK).

As described above, the clock control circuit 200 outputs the output control clock signal (DOCLK) only when data are substantially received. Therefore, unnecessary power consumption of the semiconductor memory device 100 can be saved. Furthermore, since unnecessary power consumption of the semiconductor memory device 100 is reduced, a power noise phenomenon of the semiconductor memory device 100 can be reduced. Additionally, in the case where the semiconductor memory device 100 is applied to mobile products, the battery time of the mobile products can be enhanced.

As described above, in accordance with a clock control circuit and semiconductor memory device including the clock control circuit, and data input and output operation method of the semiconductor memory device according to the present invention, in the data input and output operations, an output control clock signal is output only when data are substantially received. Therefore, unnecessary power consumption and a power noise phenomenon can be reduced.

Furthermore, in the case where the semiconductor memory device according to the present invention is applied to mobile products, the battery time of the mobile products can be enhanced.

Although the foregoing description has been made with reference to the preferred embodiments, it is to be understood that changes and modifications of the present invention may be made by the ordinary skilled in the art without departing from the spirit and scope of the present invention and appended claims.

What is claimed is:

1. A clock control circuit of a semiconductor memory device, comprising:

a clock generator that selectively generates any one of an input control clock signal and an output control clock signal only during a predetermined time in response to an input clock signal, an internal write enable signal and a latency signal; and a clock latency control circuit that generates the latency signal in response to the input clock signal, the internal write enable signal, the internal address valid signal and the internal chip select signal, wherein a data input buffer receives external input data and outputs internal input data to an internal circuit, in response to the input control clock signal, and a data output buffer receives internal output data from the internal circuit and outputs external output data, in response to the output control clock signal.

2. The clock control circuit as claimed in claim 1, wherein the clock latency control circuit includes:

a clock pulse generator that generates first and second clock pulse signals in response to the input clock signal;

a first shift register, which is reset in response to a reset signal and outputs a first shift signal in response to the first and second clock pulse signals and the internal address valid signal;

a second shift register, which is reset in response to the reset signal and outputs a second shift signal in response to the first and second clock pulse signals and the first shift signal; and a latency signal generator that outputs the reset signal and the latency signal in response to the internal write enable signal, the internal address valid signal, the first and second shift signals and the internal chip select signal.

3. The clock control circuit as claimed in claim 2, wherein
the first shift register delays the internal address valid signal in synchronization with the first and second clock pulse signals and outputs the delayed signal as the first shift signal, and
the second shift register delays the first shift signal in synchronization with the first and second clock pulse signals and outputs the delayed signal as the second shift signal.

4. The clock control circuit as claimed in claim 2, wherein the latency signal generator includes:
a first control logic circuit that outputs a first pulse signal and the reset signal in response to the internal address valid signal and the internal chip select signal;
a second control logic circuit that outputs a second pulse signal in response to the first and second shift signals and the internal write enable signal;
a driver circuit that outputs an internal voltage or a control signal of a ground voltage level to an output node in response to the first and second pulse signals;
a latch circuit that latches the control signal and outputs the latched signal; and
an output circuit that outputs the latched signal as the latency signal.

5. The clock control circuit as claimed in claim 4, wherein the latency signal generator further includes a reset control circuit that resets the latch circuit in response to a power-up signal.

6. The clock control circuit as claimed in claim 4, wherein the first control logic circuit includes:
a NOR gate that outputs a logic signal in response to the internal address valid signal and the internal chip select signal;
a first inverter that inverts the logic signal and outputs an inverted logic signal;
a pulse signal generator that generates the first pulse signal based on the inverted logic signal; and
a second inverter that inverts the first pulse signal and outputs the inverted signal as the reset signal.

7. The clock control circuit as claimed in claim 4, wherein the second control logic circuit includes:
a first inverter that inverts the internal write enable signal and outputs an inverted internal write enable signal;
a first NAND gate that outputs a first logic signal in response to the first shift signal and the internal write enable signal;
a second NAND gate that outputs a second logic signal in response to the inverted internal write enable signal and the second shift signal;
a third NAND gate that outputs a third logic signal in response to the first and second logic signals;
a pulse signal generator that generates an internal pulse signal based on the third logic signal; and
a second inverter that inverts the internal pulse signal and outputs the inverted signal as the second pulse signal.

8. The clock control circuit as claimed in claim 1, wherein the clock generator generates the input control clock signal based on the input clock signal when the internal write enable signal is disabled and the latency signal is enabled, and generates the output control clock signal based on the input clock signal when the internal write enable signal is enabled and the latency signal is enabled.

9. The clock control circuit as claimed in claim 1, wherein the clock generator includes:
a first logic circuit that outputs a first logic signal and an inverted internal write enable signal in response to the input clock signal, the latency signal and the internal write enable signal;
a second logic circuit that outputs the input control clock signal in response to the first logic signal and the internal write enable signal; and
a third logic circuit that outputs the output control clock signal in response to the first logic signal and the inverted internal write enable signal.

10. The clock control circuit as claimed in claim 9, wherein the first logic circuit includes:
a NAND gate that outputs a first logic signal in response to the input clock signal and the latency signal; and
an inverter that inverts the internal write enable signal and outputs the inverted internal write enable signal.

11. The clock control circuit as claimed in claim 9, wherein the second logic circuit includes:
a NOR gate that outputs a second logic signal in response to the first logic signal and the internal write enable signal;
a pulse signal generator that generates a pulse signal based on the second logic signal; and
first and second inverters, which are connected in series to an output terminal of the pulse signal generator, delay the pulse signal and outputs the delayed signal as the input control clock signal.

12. The clock control circuit as claimed in claim 9, wherein the third logic circuit includes:
a NOR gate that outputs a second logic signal in response to the first logic signal and the inverted internal write enable signal;
a pulse signal generator that generates a pulse sign based on the second logic signal; and
first and second inverters, which are connected in series to an output terminal of the pulse signal generator, delay the pulse signal and output the delayed signal as the output control clock signal.

13. A semiconductor memory device that operates in synchronization with an external clock signal, comprising:
a clock buffer that receives an external clock signal and outputs an input clock signal;
a control signal input buffer that receives a write enable signal and outputs an internal write enable signal;
a clock control circuit that selectively generates any one of an input control clock signal and an output control clock signal in response to the input clock signal, the internal write enable signal, an internal address valid signal and an internal chip select signal;
a data input buffer that receives external input data and outputs internal input data to an internal circuit, in response to the input control clock signal; and
a data output buffer that receives internal output data from the internal circuit and outputs external output data, in response to the output control clock signal.

14. The semiconductor memory device as claimed in claim 13, wherein the clock control circuit includes:
a clock generator that selectively generates any one of the input control clock signal and the output control clock signal only during a predetermined time in response to the input clock signal, the internal write enable signal and a latency signal; and
a clock latency control circuit that generates the latency signal in response to the input clock signal, the internal write enable signal, the internal address valid signal and the internal chip select signal.

15. The semiconductor memory device as claimed in claim 14, wherein the clock latency control circuit includes:
a clock pulse generator that generates first and second clock pulse signals in response to the input clock signal;
a first shift register, which is reset in response to a reset signal and outputs a first shift signal in response to the first and second clock pulse signals and the internal address valid signal;
a second shift register, which is reset in response to the reset signal and outputs a second shift signal in response to the first and second clock pulse signals and the first shift signal; and
a latency signal generator that outputs the reset signal and the latency signal in response to the internal write enable signal, the internal address valid signal, the first and second shift signals and the internal chip select signal.

16. The semiconductor memory device as claimed in claim 15, wherein
the first shift register delays the internal address valid signal in synchronization with the first and second clock pulse signals and outputs the delayed signal as the first shift signal, and
the second shift register delays the first shift signal in synchronization with the first and second clock pulse signals and outputs the delayed signal as the second shift signal.

17. The semiconductor memory device as claimed in claim 15, wherein the latency signal generator includes:
a first control logic circuit that outputs a first pulse signal and the reset signal in response to the internal address valid signal and the internal chip select signal;
a second control logic circuit that outputs a second pulse signal in response to the first and second shift signals and the internal write enable signal;
a driver circuit that outputs an internal voltage or a control signal of a ground voltage level to an output node in response to the first and second pulse signals;
a latch circuit that latches the control signal and outputs the latched signal; and
an output circuit that outputs the latched signal as the latency signal.

18. The semiconductor memory device as claimed in claim 17, wherein the latency signal generator further includes a reset control circuit that resets the latch circuit in response to a power-up signal.

19. The semiconductor memory device as claimed in claim 17, wherein the first control logic circuit includes:
a NOR gate that outputs a logic signal in response to the internal address valid signal and the internal chip select signal;
a first inverter that inverts the logic signal and outputs an inverted logic signal;
a pulse signal generator that generates the first pulse signal based on the inverted logic signal; and
a second inverter that inverts the first pulse signal and outputs the inverted signal as the reset signal.

20. The semiconductor memory device as claimed in claim 17, wherein the second control logic circuit includes:
a first inverter that inverts the internal write enable signal and outputs an inverted internal write enable signal;
a first NAND gate that outputs a first logic signal in response to the first shift signal and the internal write enable signal;
a second NAND gate that outputs a second logic signal in response to the inverted internal write enable signal and the second shift signal;
a third NAND gate that outputs a third logic signal in response to the first and second logic signals;
a pulse signal generator that generates an internal pulse signal based on the third logic signal; and
a second inverter that inverts the internal pulse signal and outputs the inverted signal as the second pulse signal.

21. The semiconductor memory device as claimed in claim 14, wherein the clock generator generates the input control clock signal based on the input clock signal when the internal write enable signal is disabled and the latency signal is enabled, and generates the output control clock signal based on the input clock signal when the internal write enable signal is enabled and the latency signal is enabled.

22. The semiconductor memory device as claimed in claim 14, wherein the clock generator includes:
a first logic circuit that outputs a first logic signal and an inverted internal write enable signal in response to the input clock signal, the latency signal and the internal write enable signal;
a second logic circuit that outputs the input control clock signal in response to the first logic signal and the internal write enable signal; and
a third logic circuit that outputs the output control clock signal in response to the first logic signal and the inverted internal write enable signal.

23. The semiconductor memory device as claimed in claim 22, wherein the first logic circuit includes:
a NAND gate that outputs a first logic signal in response to the input clock signal and the latency signal; and
an inverter that inverts the internal write enable signal and outputs the inverted internal write enable signal.

24. The semiconductor memory device as claimed in claim 22, wherein the second logic circuit includes:
a NOR gate that outputs a second logic signal in response to the first logic signal and the internal write enable signal;
a pulse signal generator that generates a pulse signal based on the second logic signal; and
first and second inverters, which are connected in series to an output terminal of the pulse signal generator, delay the pulse signal and outputs the delayed signal as the input control clock signal.

25. The semiconductor memory device as claimed in claim 22, wherein the third logic circuit includes:
a NOR gate that outputs a second logic signal in response to the first logic signal and the inverted internal write enable signal;
a pulse signal generator that generates a pulse sign based on the second logic signal; and
first and second inverters, which are connected in series to an output terminal of the pulse signal generator, delay the pulse signal and output the delayed signal as the output control clock signal.

26. A data input and output operation method of a semiconductor memory device that operates in synchronization with an external clock signal, comprising the steps of:
outputting an input clock signal in response to the external clock signal;
outputting an internal write enable signal in response to a write enable signal;
generating a latency signal in response to the input clock signal, the internal write enable signal, an internal address valid signal and an internal chip select signal;

selectively generating any one of an input control clock signal and an output control clock signal during a predetermined time in response to the input clock signal, the internal write enable signal and the latency signal;

allowing a data input buffer to receive external input data and to output internal input data to an internal circuit, in response to the input control clock signal when the input control clock signal is generated; and allowing a data output buffer to receive internal output data from the internal circuit and to output external output data, in response to the output control clock signal when the output control clock signal is generated.

27. The data input and output operation method as claimed in claim 26, wherein the step of generating the latency signal includes the steps of:

generating first and second clock pulse signals based on the input clock signal;

outputting a first shift signal in response to the first and second clock pulse signals and the internal address valid signal;

outputting a second shift signal in response to the first and second clock pulse signals and the first shift signal; and outputting the latency signal in response to the internal write enable signal, the internal address valid signal, the first and second shift signals and the internal chip select signal.

28. The data input and output operation method as claimed in claim 26, wherein the step of selectively generating any one of the input control clock signal and the output control clock signal includes the steps of:

generating the input control clock signal based on the input clock signal when the internal write enable signal is disabled and the latency signal is enabled; and generating the output control clock signal when the internal write enable signal is enabled and the latency signal is enabled.

* * * * *